US011034216B2

United States Patent
Carrera Contreras

(10) Patent No.: US 11,034,216 B2
(45) Date of Patent: Jun. 15, 2021

(54) AIR VENT FOR A VEHICLE

(71) Applicant: ILLINOIS TOOL WORKS INC., Glenview, IL (US)

(72) Inventor: Oliver Carrera Contreras, Merzalben (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 131 days.

(21) Appl. No.: 16/185,381

(22) Filed: Nov. 9, 2018

(65) Prior Publication Data
US 2019/0143795 A1    May 16, 2019

(30) Foreign Application Priority Data

Nov. 13, 2017 (DE) .......................... 102017126563.5

(51) Int. Cl.
  *B60H 1/34* (2006.01)
(52) U.S. Cl.
  CPC ... *B60H 1/3442* (2013.01); *B60H 2001/3478* (2013.01)
(58) Field of Classification Search
  CPC .. B60H 1/3428; B60H 1/3435; B60H 1/3442; B60H 1/3414; B60H 2001/3471; B60H 2001/3478
  USPC .......................................... 454/152, 154–155
  See application file for complete search history.

(56) References Cited

U.S. PATENT DOCUMENTS

| 6,241,600 | B1* | 6/2001 | Uehara | F24F 7/013 454/235 |
| 2008/0042420 | A1* | 2/2008 | Ali | B62D 1/184 280/775 |
| 2012/0052787 | A1* | 3/2012 | Zecha | F24F 13/065 454/289 |
| 2015/0202946 | A1* | 7/2015 | Inagaki | B60H 1/3442 454/154 |
| 2017/0057328 | A1* | 3/2017 | Sano | B60H 1/3442 |

FOREIGN PATENT DOCUMENTS

| DE | 102009009241 A1 | 8/2010 |
| EP | 3103664 | 12/2016 |
| JP | 2016118284 A | 6/2016 |

\* cited by examiner

*Primary Examiner* — Vivek K Shirsat
*Assistant Examiner* — Ko-Wei Lin
(74) *Attorney, Agent, or Firm* — Thompson Hine LLP

(57) ABSTRACT

An air vent for a vehicle includes an air duct with an air inlet end and an air outlet end, and a main flow direction, a ball head within the air duct, a damping assembly supported on the ball head, and an annular air-guiding element connected to the damping assembly, for deflecting the air flow from the main flow direction, wherein the air-guiding element is pivotable together with the damping assembly about the ball head, wherein the damping assembly has a ball-socket-shaped damping element surrounding the ball head and composed of a softer material than the ball head, at least one socket element surrounding the damping element in a form-fitting manner and composed of a harder material than the damping element, and the at least one socket element includes clamp arms clamped onto the damping element and extending parallel to a central longitudinal axis of the air-guiding element.

19 Claims, 8 Drawing Sheets

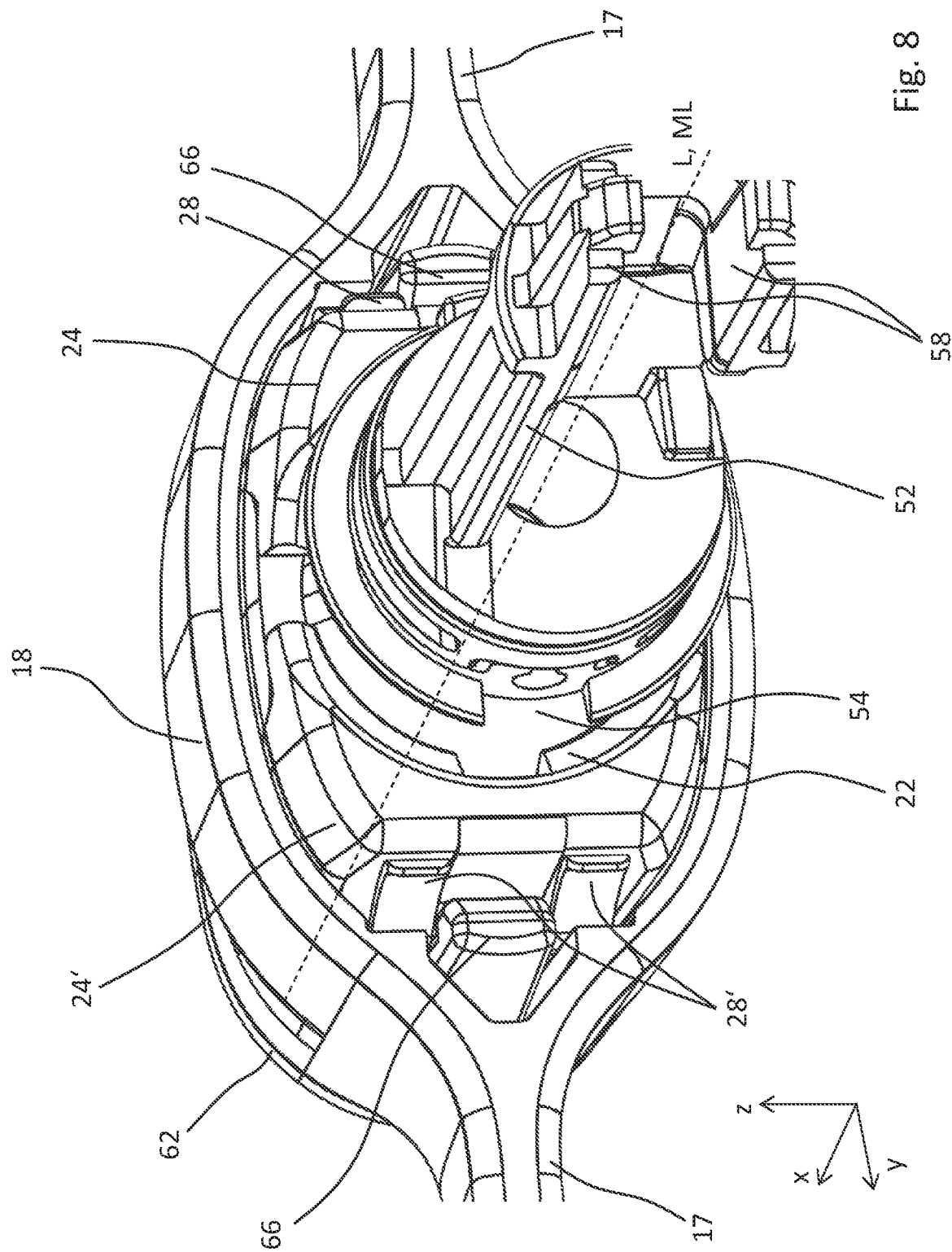

AIR VENT FOR A VEHICLE

TECHNICAL FIELD

The invention relates to an air vent for a vehicle, comprising an air duct which is bounded by a housing, with an air inlet end and an air outlet end, wherein an air flow flowing through the air duct flows along a main flow direction from the air inlet end to the air outlet end, a ball head arranged within the air duct, a damping assembly supported on the ball head, and an annular air guiding element which is arranged at the air outlet end and is connected to the damping assembly, for deflecting the air flow.

BACKGROUND

A round nozzle is known, for example, from EP 3 103 664 A1. In this case, a cross sectionally circular air guiding element is mounted on a ball head of a shaft extending through an air duct. The mounting takes place via two bearing sockets which surround the ball head and are held together by a C shaped spring. The air guiding element is pivoted together with the bearing half sockets about the ball head and therefore an air flow emerging from the air duct is directed in a desired direction. Plastics layers are arranged on the inner sides of the bearing half sockets and, during a movement of the air guiding element, act together with the bearing half sockets about the ball head as braking elements. Depending on the choice of material of the plastics layers and on the spring force of the C shaped spring holding together the bearing half sockets, a defined frictional force between the bearing sockets and the spherical head and therefore a certain operating force of the air guiding element are intended to be set.

The bearing half sockets are manufactured from two different plastics materials in a two component injection molding method, with which a certain outlay is associated. Furthermore, it has been shown that the C shaped spring cannot stably hold the forces exerted on the bearing half sockets. In particular, the spring force of the spring is greatly decreased under the effect of heat, which is particularly disadvantageous on account of the rather high temperatures occurring in an air duct of an air vent. Furthermore, an unstable spring force may occur in the case of this C shaped spring because of manufacturing tolerances. A decrease in the spring force also causes a decrease in the frictional force between bearing sockets and spherical head, which leads to an undesirable decrease in the operating force which can be applied. If the spring force decreases to too great an extent, the air guiding element also can no longer be reliably adjusted. In particular, an undesired deflection of the air guiding element may occur. For example, the air guiding element can be deflected by the air flow flowing through the air duct or by forces occurring during the operation of the vehicle. A targeted deflecting of the air is then no longer possible.

SUMMARY

The invention is based on the object of providing an air vent for a vehicle, which ensures reliable control of the air flow over a wide temperature range and is simple to manufacture.

The invention achieves the object by means of the subject matter of one or more of the claims. Advantageous refinements are the subject matter of the dependent claims, the description and the figures.

The air vent according to the invention comprises an air duct which is bounded by a housing, with an air inlet end and an air outlet end, wherein an air flow flowing through the air duct flows along a main flow direction from the air inlet end to the air outlet end,
a ball head arranged within the air duct,
a damping assembly supported on the ball head, and
an annular air guiding element which is arranged at the air outlet end and is connected to the damping assembly, for deflecting the air flow from the main flow direction thereof, wherein the air guiding element is pivotable together with the damping assembly about the ball head,
wherein the damping assembly has a ball socket shaped damping element which surrounds the ball head and is composed of a softer material than the ball head, at least one socket element which surrounds the damping element in a form fitting manner at least in sections and is composed of a harder material than the damping element, and the at least one socket element comprises clamping means which clamp onto the damping element and have at least two clamping arms extending parallel to a central longitudinal axis of the air guiding element.

The housing is preferably of hollow cylindrical design, i.e. bounds an air duct in the form of a circular ring in cross section. However, the housing can also have a different shape. The air guiding element is correspondingly preferably in the form of a circular ring. The main flow direction of the air flow flowing through the air duct preferably runs along a central longitudinal axis of the housing, i.e. along the cylinder axis in the case of a cylindrical housing.

The air guiding element is supported together with the damping assembly on the ball head in a pivotable manner. The air guiding element forms a first joint part of a ball and socket joint here together with the damping assembly while the ball head forms a second joint part of the ball and socket joint. The ball head can be connected to the housing of the air duct via a bearing component. The air guiding element is supported in relation to the housing via the ball head. The air guiding element, the damping assembly and the ball head are also jointly referred to below as an air control device. The damping element is in the form of a hollow ball with a receiving opening for receiving the ball head of the bearing component. The ball head does not have to form a complete ball, but rather can also consist of a ball portion. The damping element placed onto the ball head is in turn surrounded by at least one socket element. The at least one socket element is composed here of a harder material than the damping element. The ball head is likewise composed of a harder material than the damping element. In particular, the ball head and the at least one socket element can be composed of the same material. The materials can be plastics. The at least one socket element forms a socket which preferably does not completely surround the damping element and is held together according to the invention by the clamping means. The clamping means press the at least one socket element onto the damping element. In this case, an—in particular single piece—socket element with at least one opening can be provided, wherein the opening permits deformation of the socket element by the clamping means. The socket element can be, for example, omega shaped or can comprise a plurality of elements connected with film hinges. In particular, two socket elements which are not connected to each other can be provided, wherein the clamping means press the two socket elements onto the damping element. The air guiding element is fixedly connected to the damping assembly in such a manner that the damping assembly and the air guiding element are jointly pivoted about the ball head. Pivoting refers here in particular to an inclination of the air guiding element together with the damping assembly about an axis which lies in a plane perpendicular to the central longitudinal axis of the housing. For this purpose, an operator can grasp and incline the air guiding element. The air guiding element can consequently serve as an operating element. However, a separate operating element can also be provided.

According to the invention, at least two clamping arms are provided as the clamping means, the clamping arms extending along different axes running parallel to the central longitudinal axis of the air guiding element. The central longitudinal axis of the air guiding element runs centrally here through an air outlet opening in the annular air guiding element. In a mounted state, the clamping arms consequently extend into the air duct. In a neutral position of the air guiding element, in which the air flow is not deflected, the central longitudinal axis of the air guiding element can coincide in particular with the central longitudinal axis of the housing. The clamping means can in particular be connected to one another. The clamping arms can also be formed separately from one another, as will also be explained later. The clamping arms press the at least one socket element onto the softer damping element and therefore press the softer damping element onto the ball head. This produces a frictional force between the damping element and the ball head, the frictional force making pivoting of the air guiding element more difficult and therefore preventing an inadvertent adjustment of the air guiding element. In addition, an operating force to be applied is defined by the clamping means. The clamping arms here act as leaf springs on the at least one socket element and clamp the latter against the damping element. It has been shown that, owing to the geometry according to the invention of the clamping means, the clamping force is maintained particularly reliably. In particular, the clamping force remains substantially stable even at different temperatures. An operating force to be applied in order to adjust the air guiding element therefore remains constant over a long period of time and also over a wide temperature range because of the clamping arms in the manner of leaf springs. In addition, the air vent according to the invention can be manufactured more simply since no parts to be produced in a two component injection molding method are required. The damping element composed of a softer material can be manufactured separately from the socket elements composed of a harder material. The clamping arms do not all have to be identically designed here. In particular, the clamping arms can be configured differently in such a manner that the clamping arms each exert a different clamping force and/or concentrate the clamping force.

According to one refinement, the clamping means are composed of metal. The clamping means are therefore particularly heat resistant, and in particular a temperature induced expansion of the material is thus particularly small. Consequently, the force exerted by the clamping means does not decrease noticeably even at high temperatures. The air guiding element is therefore held more reliably in a set position and an operating force to be applied in order to adjust the air guiding element remains constant over a wide temperature range.

According to a further refinement, the clamping means are designed as integral clamps with a head portion from which the clamping arms extend away. The clamping arms here in particular form leaf springs which, in a mounted state, are pretensioned against the at least one socket element by the head portion. Such a clamp is particularly stable, i.e. reliably maintains its clamping force. Since the clamp is only composed of one part, it is also simple to manufacture. Such a clamp is preferably placed—with respect to the mounted state in the air duct—on a central longitudinal axis of the housing counter to the main direction of flow to the socket elements. The head portion here can lie against a surface, which points downstream, of the socket elements or of the damping element.

According to one refinement, the clamping arms sit non-rotatably on the socket elements by means of a form fit. The clamping arms consequently engage around the at least one socket element in a form fitting manner. For example, the clamping arms can engage in depressions of the socket elements or can engage around elevations of the socket elements. The clamping arms can also comprise a plurality of clamping elements which lie flat against a respective level surface of the socket formed by the at least one socket element. A form fit can thereby also be produced.

According to a further refinement, the clamping arms exert a clamping force on the damping element from two mutually opposite sides. Consequently, the clamping arms can be pretensioned against each other from two mutually opposite sides. This can be achieved in particular by a configuration in the form of a clamp, as explained above. It has been recognized that a reliable clamping of the at least one socket element against the damping element by means of such a clamping acting from two opposite sides is already sufficient. Clamping means of this type are structurally particularly simple. In particular, the clamping means can have at least four clamping arms which lie opposite one another in pairs. Two pairs of clamping arms can therefore be pretensioned against one another in a manner lying opposite one another. The clamping arms each forming a pair can be spaced apart from one another and can each grip a projection protruding from an outer side of the at least one socket element between them. The clamping arms can therefore form a form fit with the at least one socket element.

According to one refinement, the damping element is composed of an elastomer. In particular, the damping element can be composed of a thermoplastic elastomer or preferably of silicone. Silicone is in particular particularly heat resistant and is in particular subject to only a slight relaxation upon heating. This likewise contributes to maintaining a constant frictional force between the damping element and the ball head and therefore to keeping the operating force of the air guiding element constant or to preventing an undesirable adjustment of the air guiding element. The at least one socket element and the ball head can be composed here in particular of a plastic which is harder than silicone.

According to one refinement, the air vent comprises a bearing component with a rotatable shaft which extends along a central longitudinal axis of the air duct and at the end of which that faces the air outlet end the ball head is arranged, wherein the air vent furthermore comprises a shut off element which is arranged in the air duct upstream of the air guiding element and is in engagement with that end of the shaft which faces away from the ball head, wherein the ball head is in engagement with the damping assembly in such a manner that, when the damping assembly is rotated about the central longitudinal axis of the air duct, the shaft is carried along and the shut off element is adjusted. According to this refinement, a shut off element is provided which lies in the air duct and serves for throttling or for completely stopping the air flow. The shut off element can comprise, for example, one or more shut off flaps which are pivoted in relation to the air flow. The shaft of the bearing component is in engagement with the shut off element via a connecting portion, for example a cone gearwheel. In principle, the air guiding element is pivotable together with the damping assembly about the ball head, as explained above. According to the present refinement, the air guiding element is also rotatable together with the damping assembly and the ball head and therefore the entire shaft about the central longitudinal axis. Consequently, the air guiding element can be pivoted with the damping assembly for example upward, downward or to the sides, with reference to a fitted state of the air vent. If, however, the air guiding element is rotated about the central longitudinal axis of the housing, not only does the damping assembly move, but so too does the entire shaft. Thus, by rotation of the air guiding element, the shut off element can be adjusted and therefore the air duct opened or closed or the air flow throttled.

According to one refinement, the ball head has at least one pin which protrudes radially outward in a direction perpendicular to the central longitudinal axis and is accommodated in at least one elongate guide groove of the damping assembly, wherein the at least one guide groove substantially extends along a longitudinal axis of the air guiding element. The ball head and damping assembly are here in engagement in the above explained manner via the at least one pin and the corresponding guide groove, i.e. in such a manner that, during rotation of the damping assembly about the central longitudinal axis, the shaft is carried along and the shut off element is adjusted. In particular, two mutually opposite pins extending radially outward can be provided on the ball head. Accordingly, the damping assembly can comprise two mutually opposite guide grooves. The at least one guide groove runs along a longitudinal axis of the air guiding element, wherein the longitudinal axis runs in the direction of the air flow parallel to a cylinder axis of the air guiding element. The at least one guide groove does not extend here exactly on the longitudinal axis, but rather in particular on a curved path. During pivoting of the damping assembly about a first axis, the at least one pin moves here along the at least one guide groove. During pivoting of the damping assembly about a second axis perpendicular to the first axis, the at least one guide groove is tilted in relation to the pin. During pivoting movements about further axes which lie in a plane spanned by the first and second axis, the guide groove is tilted about the at least one pin and also moved along the pin. During rotation of the damping assembly about the central longitudinal axis, the at least one pin is carried along by a boundary wall of the guide groove and consequently the ball head is rotated. The at least one guide groove can run in particular on an inner side of the at least one socket element, wherein the damping element has at least one through opening through which the pin reaches.

According to a further refinement, from an air guiding ring outwardly bounding the air guiding element, a plurality of holding arms protrude in the direction of the center of the air guiding ring and merge into a holding portion, which is arranged in the center of the air guiding ring, for connection to the damping assembly. The air guiding element can form an end portion of the air duct, which end portion can be pivoted in order to deflect the air flow from its main flow direction in any desired direction. In order to mount the air guiding element on the ball head, a plurality of holding arms, in particular two holding arms protruding into the center of the air guiding ring from opposite sides, are provided, the holding arms merging into a holding portion. The holding portion serves here for connecting to the damping assembly; in particular, the damping assembly can be accommodated in the holding portion. The clamping arms of the clamping means can be clamped here in particular between the holding portion and the at least one socket element in such a manner that an additional clamping force acting on the at least one socket element arises.

According to one refinement, the clamping arms are formed independently of each other and are prestressed in relation to the at least one socket element by means of the holding portion. By contrast to the above explained refinement of the clamping means as clamps, the clamping arms are not connected to one another here. Prestressing does not take place here via a head portion, but rather by the holding portion.

BRIEF DESCRIPTION OF THE DRAWINGS

An exemplary embodiment of the invention is explained below with reference to figures, in which:

FIG. 8 shows the illustration from FIG. 7 together with bearing component.

Unless stated otherwise, the same reference signs denote the same objects in the figures.

DETAILED DESCRIPTION

Figure 1:
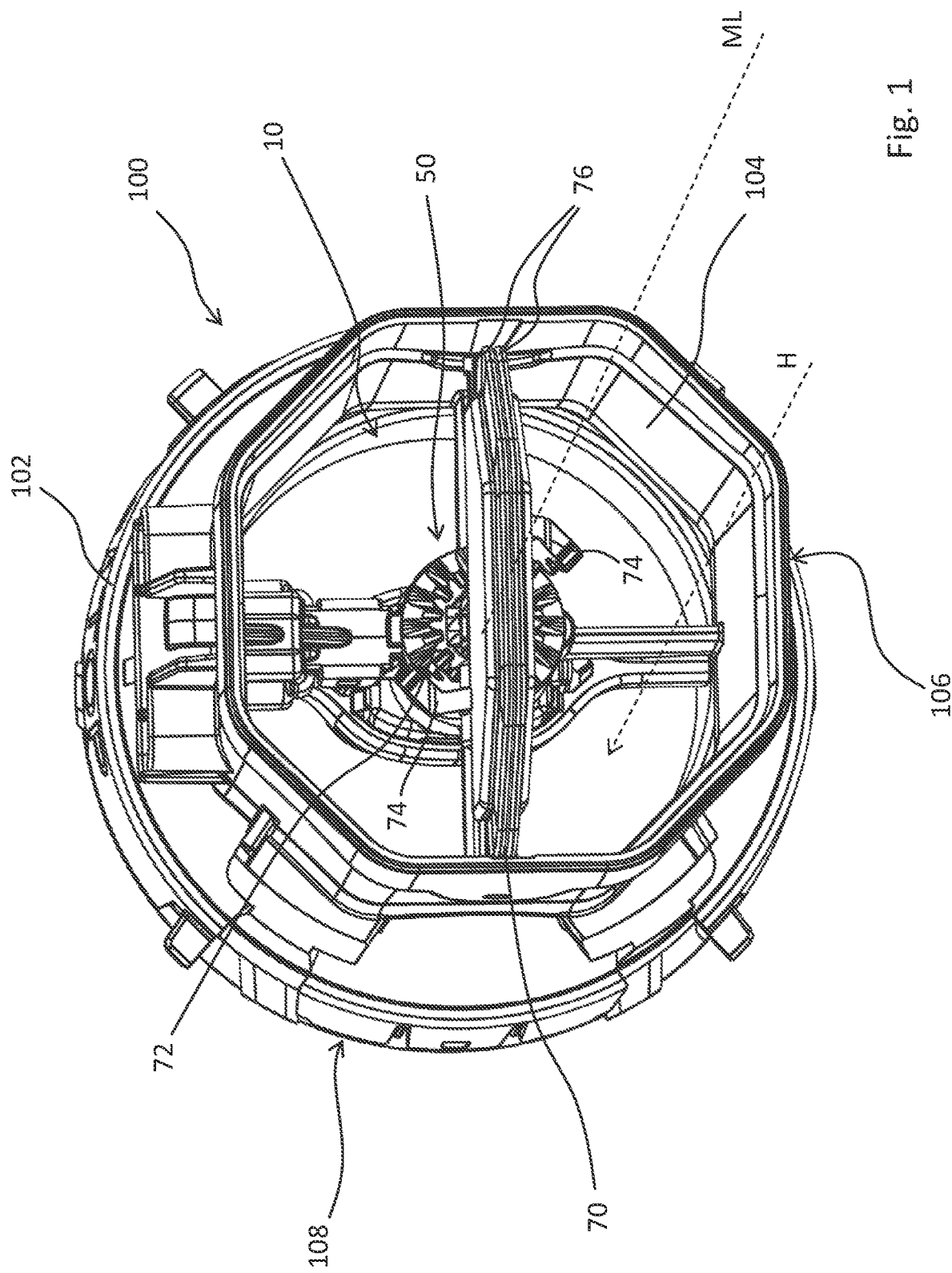
FIG. 1 shows an air vent according to the invention with an air control device, which is arranged inside the air duct, in a perspective rear view.

FIG. 1 shows an air vent 100 according to the invention with a housing 102 and an air duct 104, which is bounded by the housing 102 and through which a central longitudinal axis ML of the housing extends. The air duct 104 has an air inlet end 106 and an air outlet end 108, wherein an air flow can flow through the air duct 104 along a main flow direction H from the air inlet end 106 to the air outlet end 108. At the air outlet end 108, an air control device 10 is arranged inside the air duct 104 and is mounted on the housing 102 via a bearing component 50. In addition, a shut off element 70 which will also be explained later is apparent.

Figure 2:
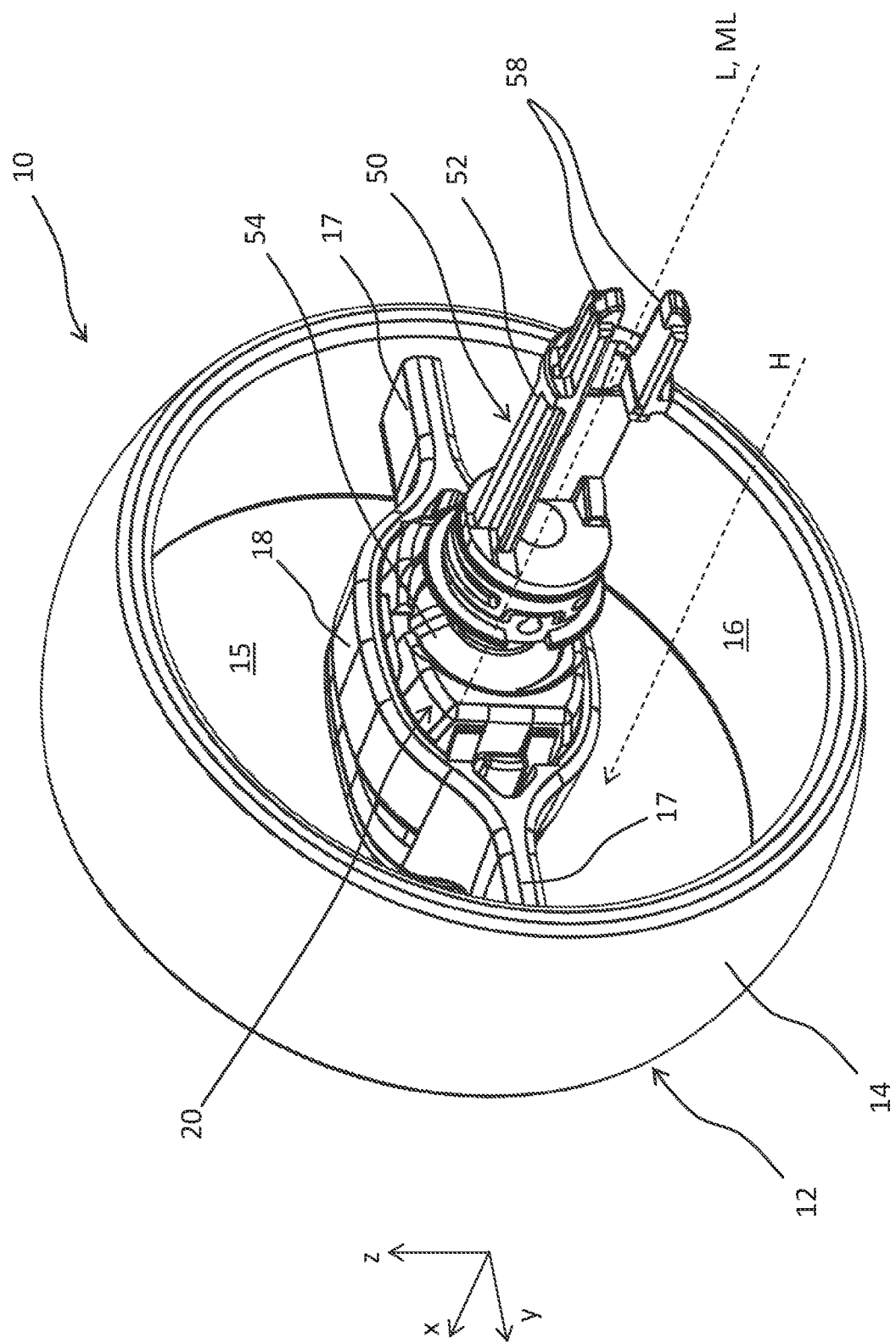
FIG. 2 shows the air control device from FIG. 1 in a perspective rear view.

FIG. 2 shows the air control device 10, comprising a cylindrical air guiding element 12, a damping assembly 20 and also the bearing component 50. The air guiding element 12 has an air guiding ring 14 which is curved on the outer circumference and has an air outlet opening 15. The air guiding ring 14 here is in the form of a circular ring. From an inner wall 16 of the air guiding ring 14, two holding arms 17 extend from two opposite sides in the direction of the center of the air guiding ring 14, the center lying on the central longitudinal axis ML, wherein the holding arms 17 merge into a holding portion 18 arranged in the center of the air guiding ring 14. The air guiding element 12 is held on a ball head 54 of the bearing component 50 via a damping assembly 20 arranged inside the holding portion 18, as will also be explained later.

Figure 3:
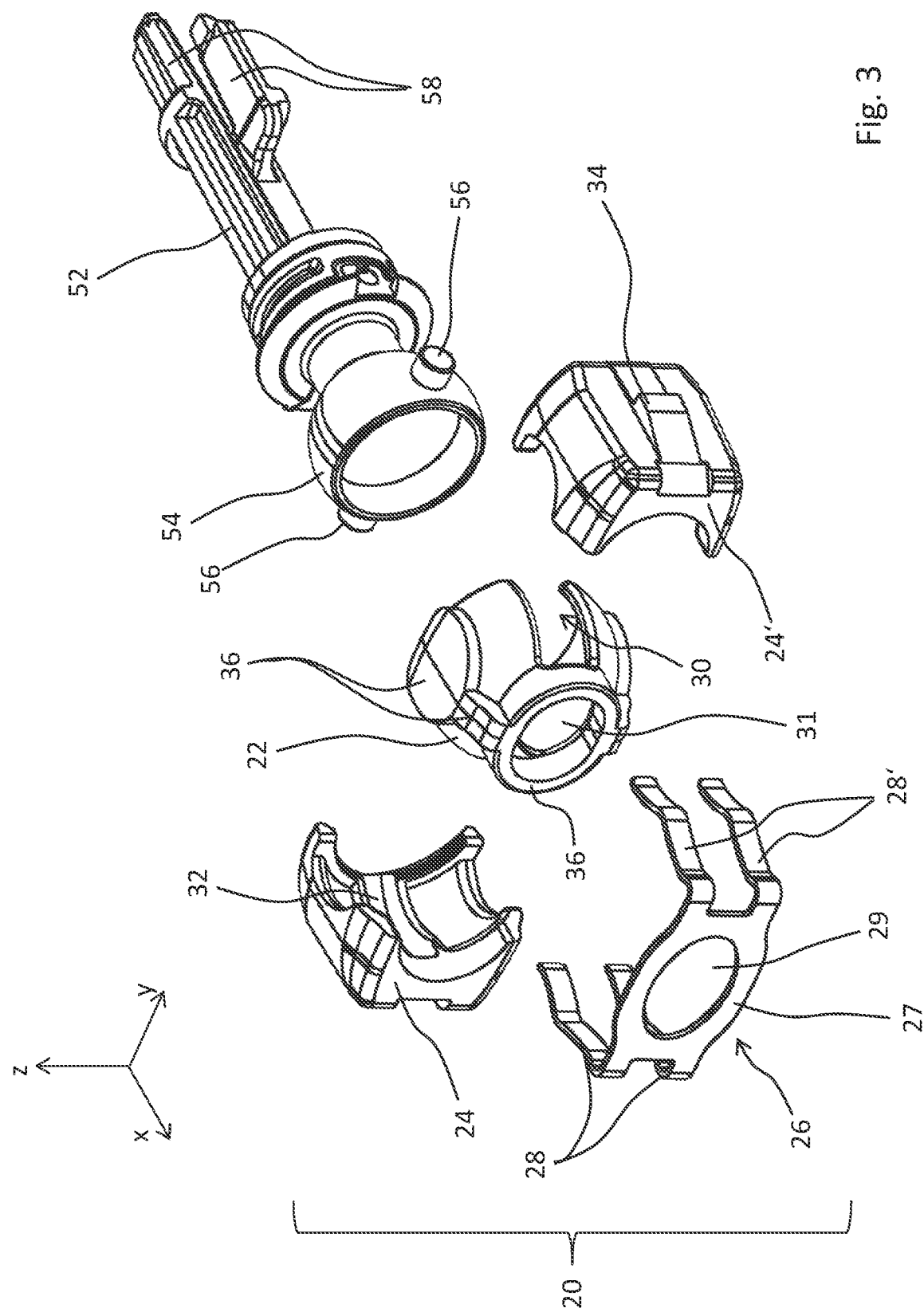
FIG. 3 shows the damping assembly and the bearing component from FIG. 2 in an exploded illustration.

The damping assembly 20 comprises, as can be seen in particular in FIG. 3, a damping element 22 in the shape of a ball socket, two socket elements 24, 24' and clamping means 26. As can likewise be seen in FIG. 3, the bearing component 50 comprises a shaft 52 which, at one end, has a ball head 54 with two pins 56 extending radially from opposite sides, and, at the opposite end, has a connecting portion 58.

In a mounted state, the ball head 54 is accommodated inside the damping element 22, wherein the pins 56 each pass through an elongate pin opening 30 of the damping element 22 (only one pin opening 30 can be seen in FIG. 3). In the mounted state, the damping element 22 is in turn surrounded at least in portions by the socket elements 24, 24'. The damping element 22 is composed of a softer material, for example silicone, than the ball head 54 and then the socket elements 24, 24'. In the mounted state, the pins 56 of the ball head 54 are each accommodated in a guide groove 32, of which only one can be seen in FIG. 3. The guide grooves 32 extend along curved paths on the inner sides of the socket elements 24, 24' and run substantially along a longitudinal axis L of the air guiding element 12, which longitudinal axis lies on the central longitudinal axis ML in the neutral position of the air guiding element that is shown in the figures. The socket elements 24, 24' are clamped onto the damping element 22 by the clamping means 26. The clamping means 26 therefore clamp the damping element 22 onto the ball head 54.

Figure 4:
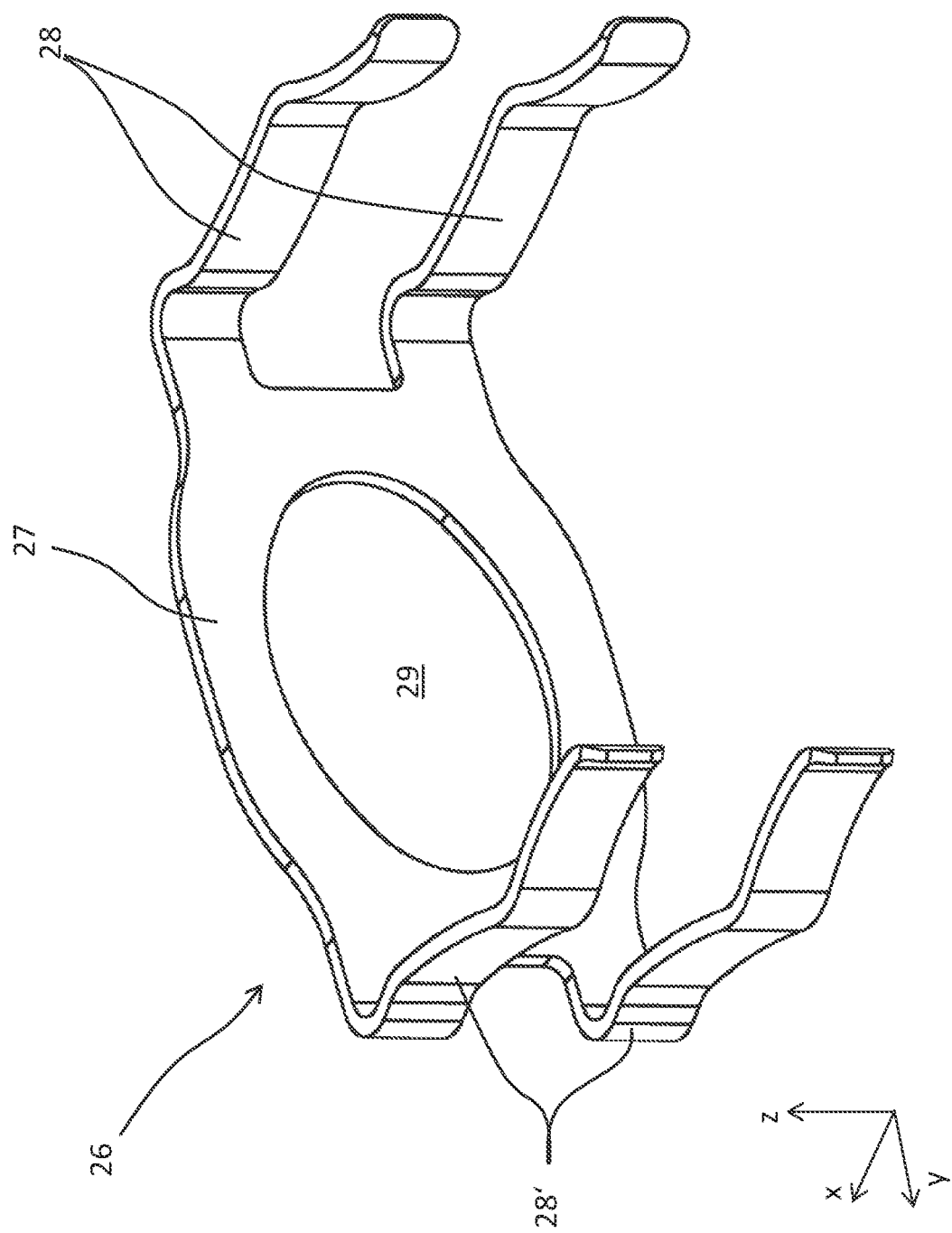
FIG. 4 shows the clamping means from FIG. 3 in a perspective rear view.
Figure 5:
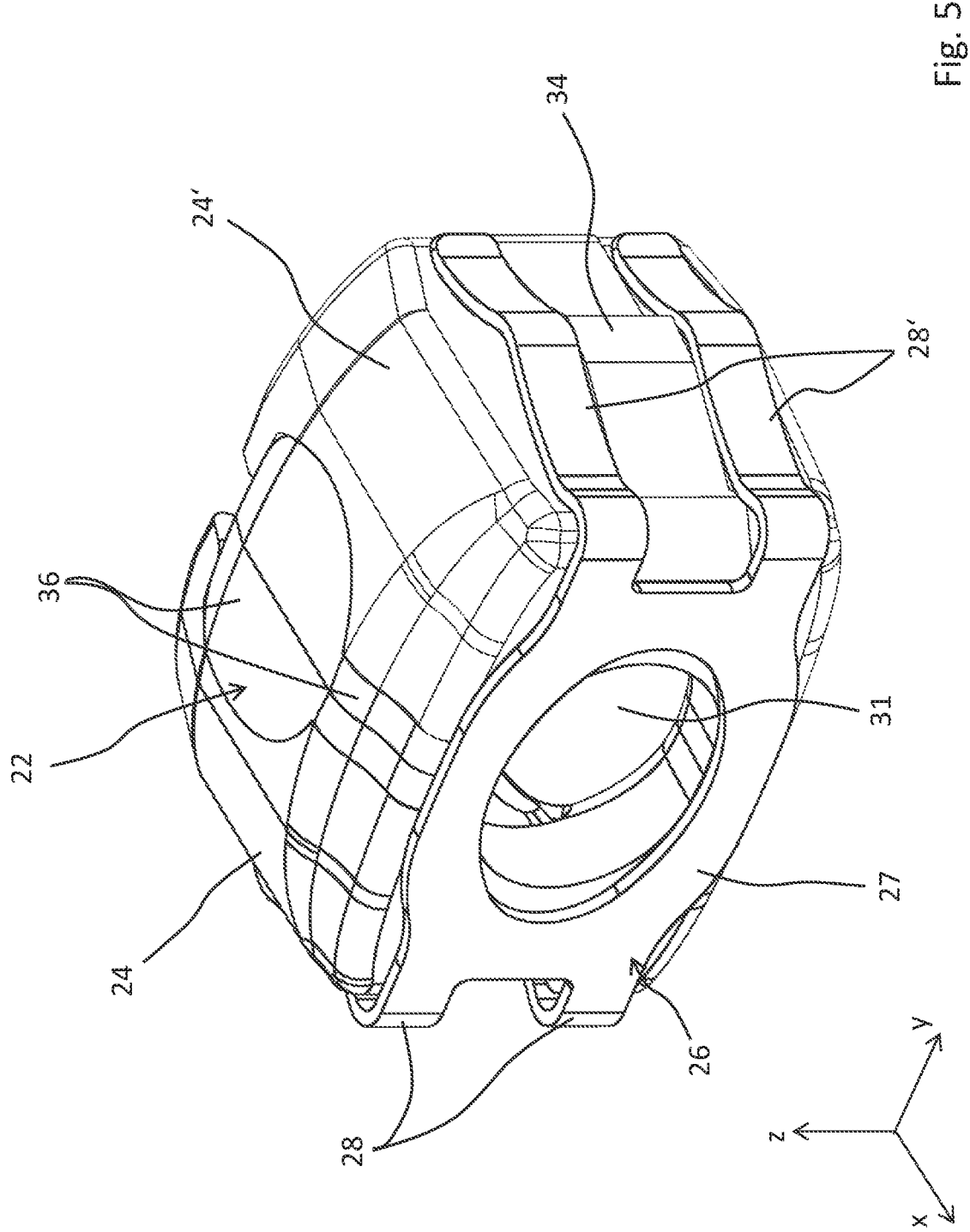
FIG. 5 shows the damping assembly from FIG. 3 in an assembled state.

The clamping means are designed here as a clamp 26, wherein the clamp 26 has a head portion 27 and four clamping arms 28, 28' which extend in pairs from the head portion 27 at a right angle. In the mounted state, the head portion 27 lies flat against the damping element 22 and against the socket elements 24, 24'. The clamping arms 28 lie here against an outer side of the socket element 24 and the clamping arms 28' against an outer side of the socket element 24'. The clamping arms 28 and the clamping arms 28' are each spaced apart from one another and, in the mounted state, each accommodate latching projections 34 between them, wherein only one latching projection can be seen in the figures. This forms a form fit by means of which the clamp 26 sits nonrotatably on the socket elements 24, 24'. In FIG. 4, the clamp 26 is illustrated in a rear view for illustrative purposes. FIG. 5 shows the assembled state of the damping assembly 20.

The damping element 22 furthermore has outwardly protruding spacer elements 36 which, in a mounted state of the damping assembly 20, space the socket elements 24, 24' from each other, as can be seen in particular in FIG. 5. This ensures that the socket elements 24, 24' which are composed of a harder material do not lie against each other, but rather lie against the damping element 22. Only in this way can the effect be achieved that the damping element 22 is pressed onto the ball head 54 by means of the clamp 26 via the socket elements 24, 24'.

Figure 6:
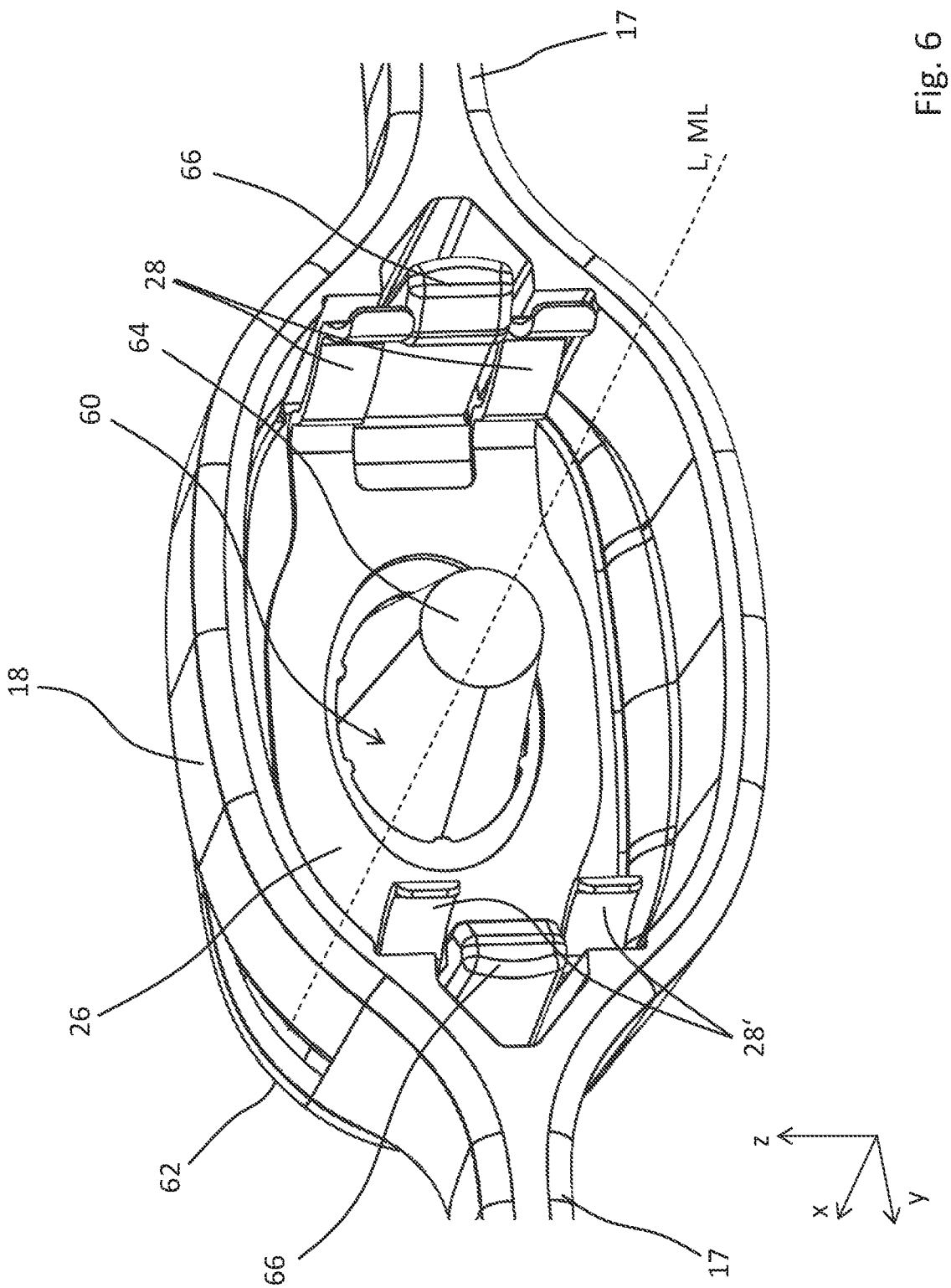
FIG. 6 shows a detail of the air control device from FIG. 2 without bearing component and without damping element and without socket element.
Figure 7:
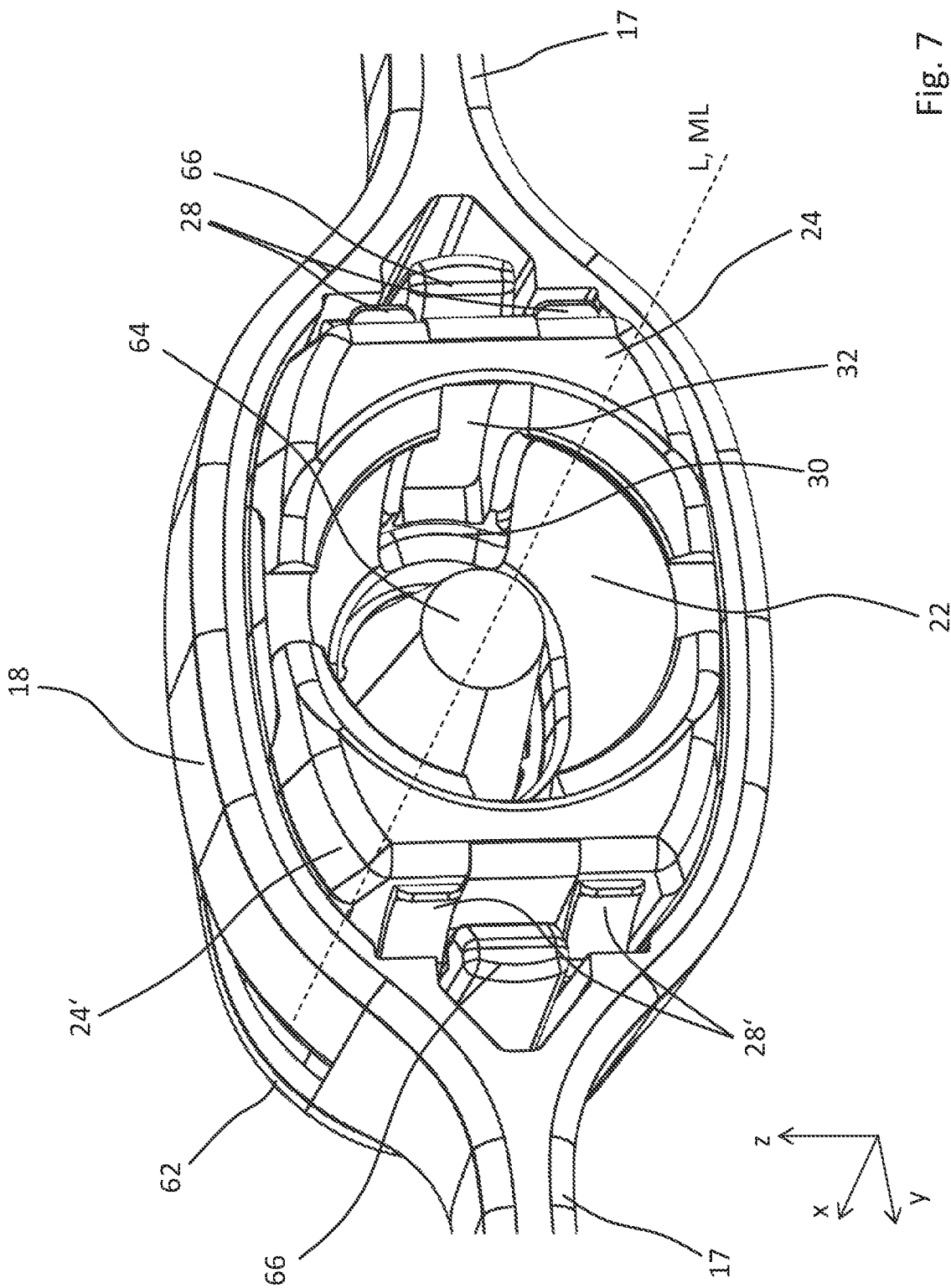
FIG. 7 shows the illustration from FIG. 6 together with damping element and socket elements.

The holding arms 17 and the holding portion 18 of the air guiding element 12 can be seen in FIGS. 6 to 8. In the illustration in FIG. 6, the clamp 26 and also a screen 60 are accommodated in the holding portion 18. The screen 60 has a front 62 which, in the mounted state of the air vent, faces a vehicle interior, a projection 64 extending along the central longitudinal axis ML into the holding portion 18, and two latching arms 66 likewise extending into the holding portion 18. In the mounted state, the latching arms 66 reach with their latching lugs behind the latching projections 34 of the socket elements 24, 24' and thus hold the socket elements 24, 24' together with the damping element 22 held therein in the holding portion 18. This can be seen in FIG. 7. The projection 64 of the screen 60 reaches here through a passage opening 29 of the clamp 26 and a passage opening 31 of the damping element 22. The guide groove 32 of the socket element 24 and the pin opening 30 of the damping element 22 can also be seen in FIG. 7. Finally, the bearing component 50 is also inserted into the holding portion 18 in FIG. 8. The pins 56 of the ball head 54 engage here in the guide grooves 32 in the manner explained above.

The air guiding element 12 can now firstly be pivoted about any axes lying in the y z plane and secondly can be rotated about the x axis. The air guiding element 12 can be gripped for this purpose at the holding frame 17 or the holding portion 18 by a person in the vehicle interior. During pivoting of the air guiding element 12, the damping assembly 20 is also moved via the holding portion 18, while the bearing component 50 remains with its ball head 54 in its position. The movement of the damping element 22 in relation to the ball head 24 is damped on the basis of the clamping force applied by the clamp 26. The clamping force arises here by means of the clamping arms 28, 28' held on the head portion 27. In addition, a clamping force also arises by the clamping of the clamping arms 28, 28' between the holding portion 18 and the socket elements 24, 24'. A braking frictional force therefore acts between damping element 22 and ball head 54. An operating force to be applied by the operator is defined by said frictional force. The air guiding element consequently serves as an operating element.

On account of the clamping means according to the invention, this frictional force and therefore the operating force remain constant for a long period of time since the clamping arms act as leaf springs and therefore maintain their clamping force for a particularly long time. In addition, clamping of this type is stable even in the event of a wide variety of temperatures prevailing in the air duct. In particular in a refinement composed of metal, the clamp is particularly heat resistant. An inadvertent adjustment of the air guiding element by, for example, the air flow or by forces occurring during the operation of the vehicle thus also do not occur.

If the air guiding element is rotated about the x axis, not only does the damping assembly 20 move, but so too does the shaft 52. This is because the pins 56 of the ball head 54, the pins being accommodated in the guide grooves 32 of the socket elements 24, 24', are carried along by the boundaries of the guide groove 32. By rotation of the shaft 52, the shut off element 70 which lies upstream in the air duct and is illustrated in FIG. 1 can be adjusted. In this case, the shaft 52 engages in a cone gearwheel 72 by means of the connecting portions 58. The cone gearwheel 72 is in turn in engagement with one flap element 76 each via a respective gearwheel 74. The flap elements 76 form a butterfly flap. By rotation of the shaft 52, the cone gearwheel 72 moves the two gearwheels 74 in opposite directions and therefore pivots the flap elements 76 into a closed position or into the open position, shown in FIG. 1, depending on the direction of rotation. By rotation of the air guiding element, the air duct can thus be opened or closed or the air flow throttled.

Aspects of the invention include those in the following paragraphs A-K.

A. An air vent for a vehicle, comprising: an air duct (104) which is bounded by a housing (102), with an air inlet end (106) and an air outlet end (108), wherein an air flow (L) flowing through the air duct (104) flows along a main flow direction from the air inlet end (106) to the air outlet end (108), a ball head (54) arranged within the air duct (104), a damping assembly (20) supported on the ball head (54), and an annular air-guiding element (12) which is arranged at the air outlet end (108) and is connected to the damping assembly (20), for deflecting the air flow (L) from the main flow direction thereof, wherein the air-guiding element (12) is pivotable together with the damping assembly (20) about the ball head (54), wherein the damping assembly (20) has a ball-socket-shaped damping element (22) which surrounds the ball head (54) and is composed of a softer material than the ball head (54), at least one socket element (24, 24') which surrounds the damping element (22) in a form-fitting manner at least in sections and is composed of a harder material than the damping element (22), and the at least one socket element (24, 24') comprises clamping means (26) which clamp onto the damping element (22) and have at least two clamping arms (28, 28') extending parallel to a central longitudinal axis (L) of the air-guiding element (12).

B. The air vent of A, wherein the clamping means (26) are composed of metal.

C. The air vent of A or B, wherein the clamping means are designed as integral clamps (26) with a head portion (27) from which the clamping arms (28, 28') extend away.

D. The air vent of any one of A-C, characterized in that the clamping arms (28, 28') sit nonrotatably on the socket elements (24, 24') by means of a form fit.

E. The air vent of any one of A-D, wherein the clamping arms (28, 28') exert a clamping force on the damping element (22) from two mutually opposite sides.

F. The air vent of E, characterized in that the clamping means (26) comprise at least four clamping arms (28, 28') which lie opposite one another in pairs.

G. The air vent of one of A-F, wherein the damping element (22) is composed of an elastomer.

H. The air vent of one of A-G, characterized in that a bearing component (50) is provided which has a rotatable shaft (52) which extends along a central longitudinal axis (ML) of the air duct (104) and at the end of which that faces away from the air outlet end (108) the ball head (54) is arranged, the air vent furthermore comprises a shut-off element (70) which is arranged in the air duct (104) upstream of the air-guiding element (12) and is in engagement with that end of the shaft (52) which faces away from the ball head (54), wherein the ball head (54) is in engagement with the damping assembly (20) in such a manner that, when the damping assembly (20) is rotated about the central longitudinal axis (ML) of the air duct (104), the shaft (52) is carried along and the shut-off element (70) is adjusted.

I. The air vent of H, wherein the ball head (54) has at least one pin (56) which protrudes radially outward in a direction perpendicular to the central longitudinal axis (ML) and is accommodated in at least one elongate guide groove (32) of the damping assembly (20), wherein the at least one guide groove (32) substantially extends along a longitudinal axis (L) of the air-guiding element (12).

J. The air vent of any one of A-I, wherein, from an air-guiding ring (14) outwardly bounding the air-guiding element (12), a plurality of holding arms (17) protrude in the direction of the center of the air-guiding ring (12) and merge into a holding portion (18), which is arranged in the center of the air-guiding ring (12), for connection to the damping assembly (20).

K. The air vent of J, wherein the clamping arms (28, 28') are formed separately from each other and are prestressed in relation to the at least one socket element (24, 24') by means of the holding portion (18).

LIST OF REFERENCE SIGNS

10 Air control device
12 Air guiding element
14 Air guiding ring
15 Air outlet opening
16 Inner wall
17 Holding arms
18 Holding portion
20 Damping assembly
22 Damping element
24, 24' Socket elements
26 Clamping means/clamp
27 Head portion
28, 28' Clamping arms
29 Passage opening
30 Pin opening
31 Passage opening
32 Guide grooves
34 Latching projections
36 Spacer elements
50 Bearing component
52 Shaft
54 Ball head
56 Pin
58 Connecting portion
60 Screen
62 Screen front
64 Projection
66 Latching arms
70 Shut off element
72 Cone gearwheel
74 Gearwheel
76 Flap elements
100 Air vent
102 Housing
104 Air duct
106 Air inlet end
108 Air outlet end
H Main flow direction
L Longitudinal axis of air guiding element
ML Central longitudinal axis

What is claimed is:

1. An air vent for a vehicle, comprising:
a housing with an air duct therethrough, the air duct including an air inlet end and an air outlet end, wherein an air flow flowing through the air duct flows along a main flow direction from the air inlet end to the air outlet end,
a ball head arranged within the air duct,
a damping assembly supported on the ball head, and
an annular air-guiding element which is arranged at the air outlet end and is connected to the damping assembly, for deflecting the air flow from the main flow direction thereof, wherein the air-guiding element is pivotable together with the damping assembly about the ball head,
wherein the damping assembly has a ball-socket-shaped damping element which surrounds the ball head and is composed of a material that is softer than a material of the ball head, at least one socket element which surrounds the damping element in a form-fitting manner at least in sections and is composed of a material that is harder than the material of the damping element, wherein the damping element is composed of an elastomer.

2. The air vent as claimed in claim 1, further comprising clamping means that engages the at least one socket element and clamps the at least one socket element onto the damping element, the clamping means having at least two clamping arms extending parallel to a central longitudinal axis of the air-guiding element and composed of metal.

3. The air vent as claimed in claim 2, wherein the clamping means includes an integral clamp with a head portion from which the at least two clamping arms extend away.

4. The air vent as claimed in claim 2, wherein the at least one socket element comprises a first socket element and a second socket element, wherein the at least two clamping arms sit nonrotatably on the first socket element and the second socket element by means of a form fit.

5. The air vent as claimed in claim 2, wherein the at least two clamping arms exert a clamping force against the at least one socket element onto the damping element from two mutually opposite sides.

6. The air vent as claimed in claim 5, characterized in that the clamping means comprise at least four clamping arms which lie opposite one another in pairs.

7. The air vent as claimed in claim 1, characterized in that
a bearing component is provided which has a rotatable shaft which extends along a central longitudinal axis of the air duct, wherein the rotatable shaft includes a first end and a second end, wherein the ball head is arranged at the first end of the rotatable shaft,
the air vent furthermore comprises a shut-off element which is arranged in the air duct upstream of the air-guiding element and is in engagement with the second end of the rotatable shaft, wherein the second end faces away from the ball head,
wherein the ball head is in engagement with the damping assembly in such a manner that, when the damping assembly is rotated about the central longitudinal axis of the air duct, the rotatable shaft is carried along and the shut-off element is adjusted.

8. The air vent as claimed in claim 7, wherein the ball head has at least one pin which protrudes radially outward in a direction perpendicular to the central longitudinal axis and is accommodated in at least one elongate guide groove of the damping assembly, wherein the at least one guide groove substantially extends along a longitudinal axis of the air-guiding element.

9. The air vent as claimed in claim 1, wherein, from an air-guiding ring outwardly bounding the air-guiding element, a plurality of holding arms protrude in the direction of the center of the air-guiding ring and merge into a holding portion, which is arranged in the center of the air-guiding ring, for connection to the damping assembly.

10. The air vent as claimed in claim 9, wherein the clamping arms are formed separately from each other and are prestressed in relation to the at least one socket element by means of the holding portion.

11. The air vent as claimed in claim 1, wherein the softer material of the damping element engages the material of the ball head to produce a frictional force between the damping element and the ball head that prevents an inadvertent movement of the ball head relative to the damping element.

12. An air vent for a vehicle, comprising
a housing with an air duct therethrough, the air duct including an air inlet end and an air outlet end, wherein an air flow flowing through the air duct flows along a main flow direction from the air inlet end to the air outlet end,
a ball head arranged within the air duct,
a damping assembly supported on the ball head, and
an annular air-guiding element arranged at the air outlet end and connected to the damping assembly, for deflecting the air flow from the main flow direction, wherein the air-guiding element is pivotable together with the damping assembly about the ball head,
wherein the damping assembly has a ball-socket-shaped damping element surrounding the ball head, and at least one elongate groove;
wherein the ball head has at least one pin which protrudes radially outward in a direction perpendicular to a central longitudinal axis of the air guiding element and is accommodated in the at least one elongate guide groove of the damping assembly.

13. The air vent of claim 12, wherein the ball-socket-shaped damping element is composed of a material that is softer than a material of the ball head, and at least one socket element surrounds the damping element in a form-fitting manner at least in sections and is composed of a material that is harder than the material of the damping element.

14. The air vent as claimed in claim 13, further comprising first and second clamping arms that clamp the at least one socket element onto the damping element, wherein the first and second clamping arms extend parallel to a central longitudinal axis of the air-guiding element and the clamping arms are composed of metal.

15. The air vent as claimed in claim 14, wherein the first and second clamping arms both extend from a common head portion.

16. The air vent as claimed in claim 15, wherein the first and second clamping arms sit non-rotatably on the at least one socket element with a form fit engagement.

17. An air vent for a vehicle, comprising:
a housing with an air duct therethrough, the air duct including an air inlet end and an air outlet end, wherein an air flow flowing through the air duct flows along a main flow direction from the air inlet end to the air outlet end,
a ball head arranged within the air duct,
a damping assembly supported on the ball head, and
an annular air-guiding element which is arranged at the air outlet end and is connected to the damping assembly, for deflecting the air flow from the main flow direction thereof, wherein the air-guiding element is pivotable together with the damping assembly about the ball head,
wherein the damping assembly has a ball-socket-shaped damping element which surrounds the ball head and is composed of a material that is softer than a material of the ball head, at least one socket element which surrounds the damping element in a form-fitting manner at least in sections and is composed of a material that is harder than the material of the damping element;
wherein, from an air-guiding ring outwardly bounding the air-guiding element, a plurality of holding arms protrude in the direction of the center of the air-guiding ring and merge into a holding portion, which is arranged in the center of the air-guiding ring, for connection to the damping assembly.

18. The air vent as claimed in claim 17, wherein the damping element is composed of an elastomer.

19. The air vent as claimed in claim 18, wherein the softer material of the damping element engages the material of the ball head to produce a frictional force between the damping element and the ball head that prevents an inadvertent movement of the ball head relative to the damping element.

* * * * *